Feb. 28, 1956

P. W. ROMINE ET AL 2,736,296

HYDRAULIC STEP DRILLING UNIT

Filed Dec. 26, 1952

INVENTORS.
Paul W. Romine,
Andrew Armstrong.
BY
Jay C. Taylor
ATTORNEY.

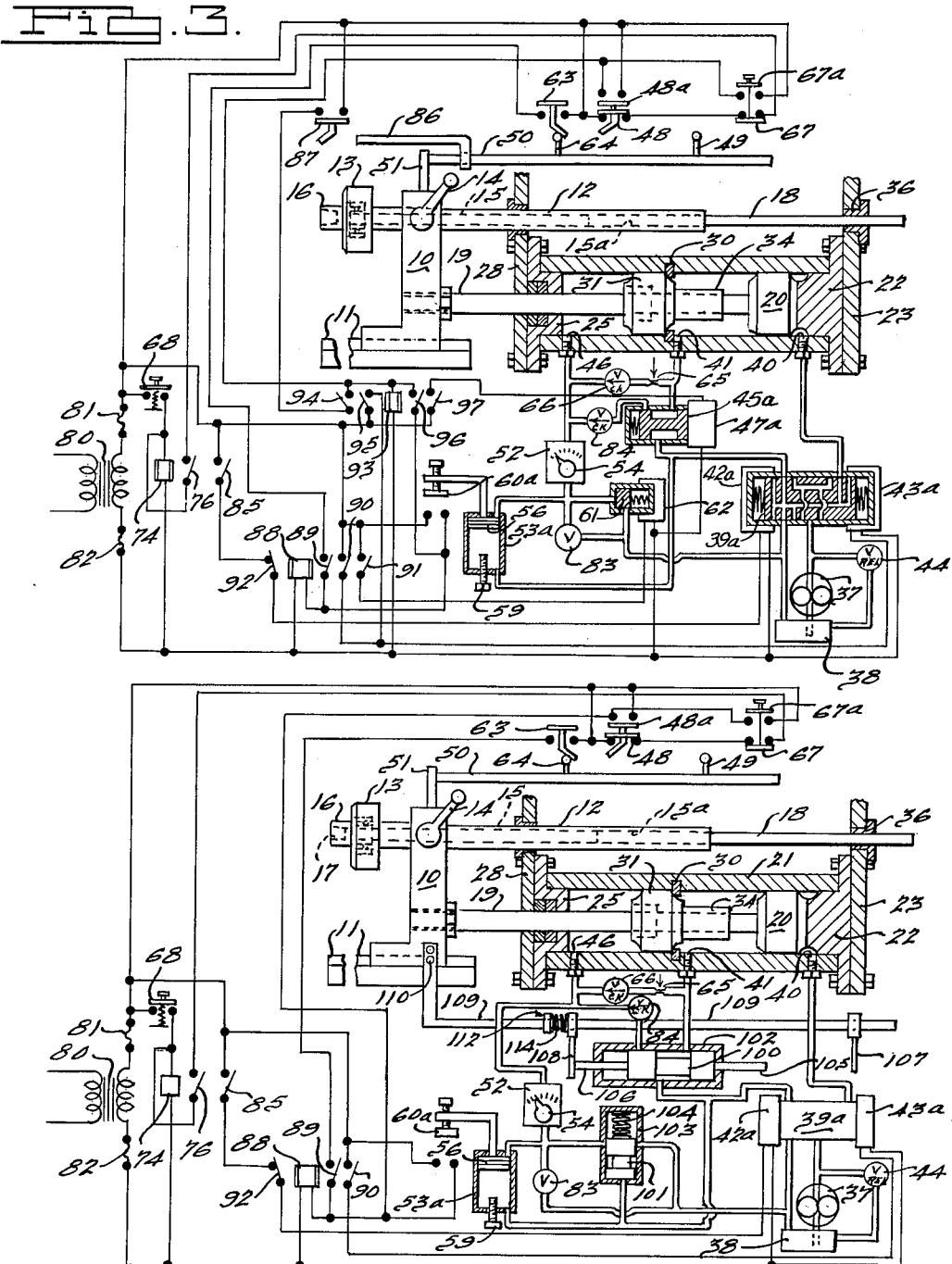

United States Patent Office 2,736,296
Patented Feb. 28, 1956

2,736,296

HYDRAULIC STEP DRILLING UNIT

Paul W. Romine and Andrew Armstrong, St. Clair Shores, Mich., assignors of one-third to Charles Leitschuh Application December 26, 1952, Serial No. 327,999

11 Claims. (Cl. 121—45)

This invention relates to a pressure controlled, hydraulically actuated step feed mechanism for deep hole machine drilling and is a continuation in part of copending application Serial No. 213,972, filed March 5, 1951, now issued as Patent No. 2,631,480, March 17, 1953.

In certain machine drilling operations, as for example in the fabrication of automobile crankshafts where the hole drilled is comparatively deep with respect to its diameter, it is necessary to carry out the drilling operation in a series of drilling steps of progressively increasing depth. After each step, the drill is withdrawn from the hole both to cool the drill and to clear the hole from shavings.

An important object of the present invention is to provide an improved hydraulically actuated control mechanism cooperable with a machine drill and automatically operative to advance the latter rapidly toward the workpiece, then to retard the rate of advance of the drill just before it engages the workpiece and to advance the drill at the retarded rate in a drilling step until the hole is drilled to a predetermined depth approximately equal to its diameter, then to withdraw the drill rapidly from the hole to clear the same from shavings and to permit access of cooling fluid to the drill tip, then to repeat the foregoing cycle successively and automatically until the desired final depth of the hole is achieved, whereupon the drill is rapidly withdrawn finally from the hole and the automatic cycle terminated. The second and each succeeding rapid advance of the drill during the automatic cycle continues until the drill approaches to within a fraction of an inch of the bottom of the hole drilled in the prior step. The length of each drilling step at the retarded rate of advance is substantially the same as the initial drilling step.

Another and more specific object is to provide a mechanism of the foregoing nature comprising a hydraulically operated driving piston within a cylinder and a hydraulic dashpot or driven piston within a cylinder and adapted to be operatively engaged and driven by the driving piston when the latter has proceeded in a rapid advance stroke for a predetermined adjustable distance. Hydraulic fluid in advance of the dashpot or driven piston is discharged through a high resistance metering valve which retards the rate of advance of the driving piston. The latter is also operatively engaged with the drill carriage to move the same toward or from a workpiece to be drilled upon corresponding advance or withdrawal of the driving piston. The relationship of the pistons and drill carriage is determined so that the drill carriage is advanced rapidly toward the workpiece until just before the drill spindle engages the workpiece. The driving piston then comes into driving engagement with the driven or dashpot piston and the rate of advance of the driving piston and carriage and drill moving therewith is retarded in accordance with the adjustment of the metering valve.

Upon a predetermined advance of the dashpot piston, as measured for example by the discharge of a predetermined volume of hydraulic fluid from the dashpot cylinder through the metering valve, the hydraulic circuit for the driving piston is electromagnetically actuated to reverse the direction of movement of the driving piston and thereby to withdraw the latter from the driven or dashpot piston. The latter is thus left substantially at its most advanced position to be engaged again by the driving piston upon a repetition of the above cycle.

The drill spindle movable linearly with the driving piston is adjusted so as to be withdrawn conveniently from the workpiece when the driving piston is at its limit of withdrawal movement. The amount of rapid advance movement of the driving piston prior to its driving engagement with the driven piston is adjusted so that the driving engagement will occur immediately before the drill engages the workpiece. Accordingly the drill will not be jammed at high speed into the workpiece, but will move into the latter at the retarded speed determined by the dashpot action of fluid discharging in advance of the driven piston through the metering valve. The latter is also suitably adjusted to achieve the desired rate of drill feed during the drilling operation. Also the means for measuring the predetermined distance of slow advance of the dashpot piston is adjusted so that when the latter has advanced a predetermined distance approximately equal to the diameter of the hole being drilled, the electromagnetically actuated hydraulic circuit will be actuated to reverse the direction of movement of the driving piston.

Another object of the present invention is to provide a step feed control apparatus of the foregoing nature including simple means for assuring a slight rebound or withdrawal movement of the driven or dashpot piston after each drilling step, the driven piston thereafter remaining in position as aforesaid to be engaged by the driving piston on the next succeeding rapid advance stroke. The rebound is accomplished by introducing through a restricted orifice a small volume of hydraulic fluid into the dashpot cylinder in advance of the driven or dashpot piston during the withdrawal movement of the driving piston. Thus upon the next succeeding rapid advance stroke of the driving piston, the latter will engage the driven or dashpot piston slightly before the drill engages the workpiece, as determined by the extent of the rebound. Accordingly, the rapid advance movement of the drill toward the workpiece will be cushioned and retarded before the drill strikes the workpiece.

Still another object of the present invention is to provide an automatic step feed drill control apparatus of the foregoing nature which is operative in response to the amount of hydraulic fluid discharged from the dashpot cylinder to determine the depth of the drilling stroke at retarded speed and which is thereby readily amenable to adjustment of the lengths of both the rapid advance stroke and the slower drilling stroke as well as the speed of the drilling stroke and the position of the drill with respect to the workpiece at various stages of the drilling operation.

Other objects of this invention will appear in the following description and appended claims, reference being had to the accompanying drawings forming a part of this specification wherein like reference characters designate corresponding parts in the several views.

Figs. 3 and 4 are view similar to Fig. 1, showing two additional embodiments of the present invention.

It is to be understood that the invention is not limited in its application to the details of construcion and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
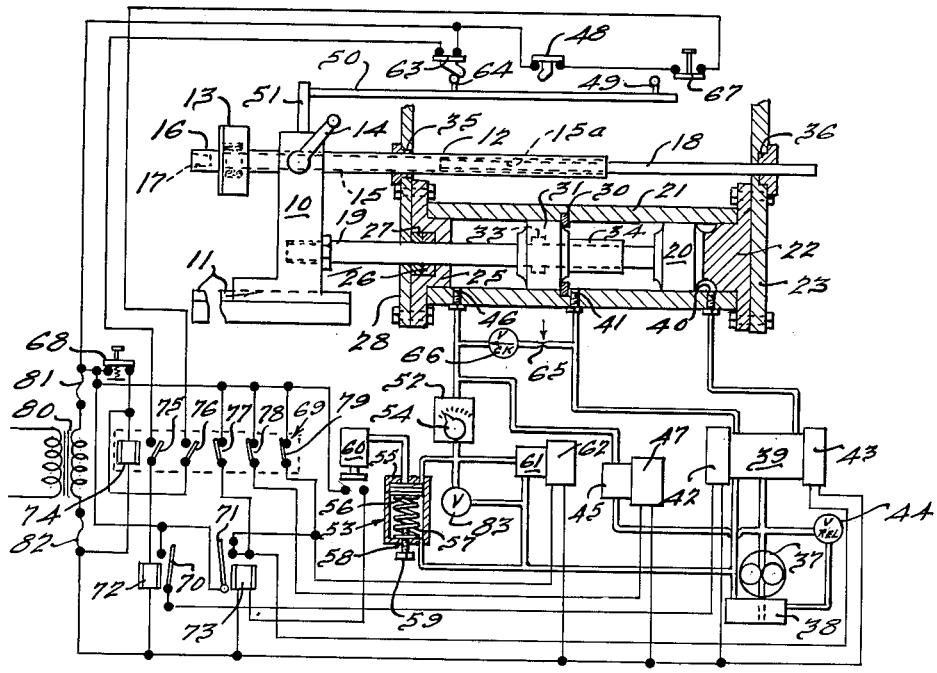
Fig. 1 is a semi-schematic fragmentary view showing an embodiment of the hydraulic step feed drill control apparatus employing the present invention, with the electrical and hydraulic circuits schematically superimposed thereon.
Figure 2:
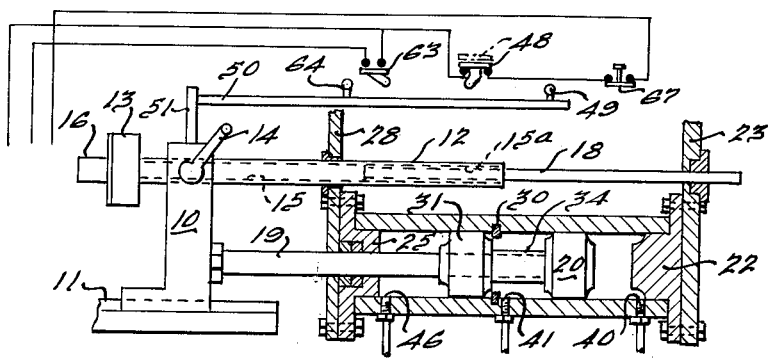
Fig. 2 is a fragmentary view similar to Fig. 1, but showing the hydraulic apparatus in position as at the end of forward movement after the first drilling operation or step.

Referring to the drawings, one embodiment of the present invention is illustrated by way of example in Figs. 1 and 2 comprising a sliding carriage 10 mounted to ride or slide along a guideway 11 toward or from a workpiece to be drilled (not shown). Extending through the upper portion of the carriage 10 parallel to the guideway 11 is a nonrotatable tubular shaft housing 12 having a thrust bearing housing 13 at its forward end and being suitably clamped in adjusted position to the carriage 10 for movement therewith by a screw type clamping lever 14. Rotatable coaxially within the housing 12 is a shaft 15 having its forward portion journaled within the bearing housing 13 and terminating in an enlarged head 16 projected forward of the housing 13 and provided with a forward opening chuck or tool holding socket 17. The latter is adapted to receive the shank of a drill securely therein so as to rotate and move the latter axially toward or from the workpiece upon corresponding movement of the carriage 10 along the guideway 11. The rearward portion of the shaft 15 is provided with a coaxial rearward opening bore 15a within which is splined the forward end of a rotatable drive shaft 18, suitably rotated by means not shown, whereby the shaft 15 is movable axially in telescoping relation with respect to the drive shaft 18 and at the same time rotated thereby. The structure described thus far may be conventional if desired and is accordingly not discussed in detail.

Linear movement of the carriage 10 along the way 11 is effected by a plunger 19 suitably secured at its forward end to the carriage 10. From the carriage 10, the plunger 19 extends rearward parallel to the way 11 and is rigidly secured at its rearward end to a hydraulically actuated driving piston 20 movable within a fixed cylinder 21. The latter is closed at its rearward end by an end plate 22 suitably secured to a fixed support 23 and is closed at its forward end by an apertured end plate 25 through which the plunger 19 is slidable upon actuation of the piston 20. The plate 25 is provided with the usual oil seal 26 and packing gland 27 and is also suitably secured to a fixed forward support 28. Intermediate the end plates 22 and 25 and recessed into the inner wall of the cylinder 21 is a stop 30 which may comprise a split ring if desired and which for the sake of discussion may be said to divide the cylinder 21 into a rearward driving cylinder portion for the driving piston 20 and a forward dashpot cylinder portion for a hydraulically actuated dashpot or driven piston 31. The latter is freely slidable on the plunger 19 forward of the stop 30 and is provided with an oil seal and packing gland 33 to prevent leakage of hydraulic fluid past the dashpot piston 31.

Replaceably mounted on the plunger 19 and freely slidable thereon between the pistons 20 and 31 is a spacer 34, by which the dashpot piston 31 is driven forward upon forward movement of the driving piston 20 after the latter moves into engagement with the rearward end of the spacer 34, Fig. 2. In order to permit adjustment of the minimum spacing between the pistons 20 and 31, the spacer 34 is preferably replaceable on the plunger 19 by a similar spacer of different size upon disassembling the piston and cylinder assembly. Also in the present instance, the housing 12 extends slidably through a flanged bushing 35 secured within the forward support 28. The rotatable drive shaft 18 is supported and journaled within a bearing 36 carried by the rearward support 23.

Hydraulic actuation of the mechanism is accomplished by a hydraulic system including a pump 37 connected with a hydraulic fluid sump or reservoir 38 and operative to deliver fluid from the latter under pressure to a fourway two-position valve 39. The latter has a return connection to the sump 38 and also connects with ports 40 and 41 located in the sidewall of the aforesaid rearward portion of cylinder 21 rearward of the piston 20 and in advance thereof respectively. The valve 39 is operated by two solenoids 42 and 43 and is shiftable to a rapid advance or forward movement position, whereat the port 40 is connected to the pump 37 and the port 41 is connected to the sump 38, upon energizing solenoid 42 when solenoid 43 is deenergized. Upon energizing solenoid 43 when solenoid 42 is deenergized, the valve 39 is shifted to a rapid return position, whereat the port 41 is connected to the pump 37 and the port 40 is connected to the sump 38.

The pressure side of the pump 37 is also connected to the sump 38 through an adjustable pressure relief valve 44, in order to prevent hydraulic pressure in the system from rising above a predetermined maximum, and is connected through a normally closed resetting valve 45 to a port 46 located in the sidewall of the cylinder 21 in advance of the piston 31. The valve 45 is opened by energizing solenoid 47, which in turn is energized when normally closed limit switch 48 is opened by contact with a dog 49, as discussed below. The latter is adjustably located along a slide rod 50 and suitably secured in adjusted position so as to open the limit switch 48 when the carriage 10 has moved to a predetermined foremost position, as for example upon completion of the final drilling process on the workpiece. The rod 50 extends parallel to the way 11 and is secured to the carriage 10 for movement therewith by means of a bracket 51.

In order to effect dashpot action of the piston 31, the port 46 is also connected through an adjustable metering and check valve 52 to an adjustable volume accumulator 53. The valve 52 is provided with a high resistance or restricted orifice and is adapted to permit unidirectional flow of hydraulic fluid into the accumulator 53 at a slow rate, whereby discharge of fluid from the port 46 and accordingly the advance of the piston 31 are retarded. Preferably the rate of flow through the metering valve is readily variable, as by turning an adjustment screw 54, whereby the rate of advance of the piston 31 is varied in accordance with the desired drilling rate.

The accumulator 53 comprises a cylindrical chamber closed at its upper end by a capping plate 55, except for the hydraulic connections thereto, and contains an axially movable piston 56 which in effect comprises an adjustable closure or bottom for the other end of the accumulator chamber. The piston 56 is yieldingly urged upward toward the end plate 55 by means of a coil spring 57 disposed under tension between the piston 56 and the lower end 58 of the accumulator 53. An adjusting screw 59 accessible from the exterior of the accumulator 53 screws upward coaxially into the accumulator cylinder and adjustably blocks or limits downward movement of the piston 56. A drain conduit connects the lower end of accumulator cylinder 53 to sump 38.

The upper end of the accumulator chamber is hydraulically connected with a normally open pressure switch 60 and is also connected through a normally closed accumulator resetting valve 61 to the sump 38. The valve 61 is opened upon energizing solenoid 62, which is energized by closing pressure switch 60, as described below. The latter is set to close an electronic circuit when the pressure in the accumulator 53 reaches a predetermined value and to return to its normally open position, after once being closed, when the pressure in the accumulator returns to atmospheric pressure.

In accordance with the foregoing, as the dashpot piston 31 advances, hydraulic fluid filling the accumulator chamber will depress piston 56 against spring 57. When piston 56 engages the movement limiting screw 59, the pressure in the accumulator 53 will suddenly rise to the value at which the pressure switch 60 closes. By suitably adjusting the screw 59, the volume of fluid required to be discharged into the accumulator 53 to actuate and close the pressure switch 60 can be predetermined. The position of the screw 59 can thus be calibrated in terms of forward displacement or movement of the piston 31 if desired.

In operation of the structure described, the apparatus is set for the drilling operation by moving the pistons 20 and 31 to their rearmost positions, Fig. 1, and by adjusting the shaft housing 12 with respect to the carriage 10 so that a drill carried in the socket 17 is conveniently withdrawn from the workpiece a distance slightly greater than the spacing between the piston 20 and spacer 34. Setting of the apparatus is accomplished by selecting a spacer 34 of suitable length and finally by loosening the clamping action of the clamping lever 14 to permit sliding adjustment of the shaft housing 12 with respect to the carriage 10, whereupon the lever 14 is tightened again to secure the housing 12 and carriage 10 together for movement as a unit.

While valves 45 and 61 are closed, valve 39 is shifted to rapid advance position by energizing solenoid 42 while solenoid 43 is deenergized. Hydraulic fluid is then pumped through port 40 and discharged through port 41 to the sump 38, causing piston 20 to advance rapidly toward the spacer 34 and simultaneously moving the plunger 19 and carriage 10 toward the workpiece. Immediately before the drill carried in the socket 17 engages the workpiece, the piston 20 engages the spacer 34 in driving engagement with the dashpot piston 31, Fig. 2. Hydraulic fluid in advance of the piston 31 is discharged through the port 46 and thence through the high resistance metering valve 52 and into the accumulator 53 as described above. By virtue of the small orifice of the metering valve 52, the rate of advance of the piston 20 is immediately retarded by engagement with the spacer 34, causing the drill to ease into the workpiece and to continue at the retarded speed determined by the adjustment of the metering valve 52 for the balance of the drilling step.

When the forward movement of the driven piston 31 has proceeded a predetermined distance determined by the setting of the adjustment screw 59, continued downward movement of the accumulator piston 56 is blocked by the screw 59, the pressure in the accumulator will suddenly rise, and the pressure switch 60 will be actuated to close an electromagnetic circuit described below. As a result, valve 61 is opened to release fluid from the accumulator 53 into the sump 38 and to permit the accumulator to reset itself by action of the spring 57 urging the piston 56 toward the end plate 55. Also as a result of closing pressure switch 60, solenoid 43 is energized while solenoid 42 is deenergized, causing valve 39 to shift to the rapid return position. Hydraulic fluid is then pumped under pressure through port 41 and discharged from port 40 to the sump 38 to move the piston 20 and plunger 19 rapidly to the right and thereby to cause rapid withdrawal of the drill from the workpiece. During the withdrawal movement, the plunger 19 slides through the dashpot or driven piston 31, leaving the latter substantially unmoved, except for a slight rebound of approximately one sixty-fourth of an inch as discussed below, in position to be engaged and driven forward by the next successive advance of the plunger 20 against the spacer 34.

At the limit of withdrawal movement of the piston 20 to the right, a normally open limit switch 63 is closed by engagement with a dog 64 adjustably mounted on the shaft 50, activating the electromagnetic circuit to cause a repetition of the above outlined cycle. However, by virtue of the advanced position of the dashpot piston 31, the next rapid advance stroke will continue until the drill is projected almost to the bottom of the hole drilled during the preceding step. The piston 20 then moves into driving engagement with the spacer 34 and piston 31, whereby the rate of advance is retarded and the drill is eased into the workpiece for the next drilling step.

In order to prevent the drill from being jammed into the workpiece at the end of each rapid advance stroke, the port 46 is connected to the port 41 and rapid return side of the valve 39 through a high resistance orifice 65 of small diameter and a check valve 66 in series which permit a slow unidirectional flow of fluid into port 46 during the rapid withdrawal or return movement of the piston 20. Thus throughout the rearward movement of the piston 20 when hydramatic fluid is delivered under pressure through the port 41, a very small rearward movement of the piston 31 also occurs as a result of a slight flow of the pressurized fluid through the restricted orifice 65 and port 46. The total desired rearward movement of piston 31 will seldom exceed approximately one sixty-fourth of an inch and is just sufficient to achieve a cushion effect to brake the rapid advance of the piston 20 prior to engagement between the drill and the bottom of the hole drilled during the preceding step. Of course a slight rebound of the piston 31 will occur as a result of the release of the pressure thereon upon withdrawal of piston 20. However, under normally low operating pressures, the extent of rebound thus afforded is unsatisfactory. The present invention employing the resistance orifice 65 assures a positive and adequate rebound at low operating pressures and is particularly useful with small diameter drills.

The electromagnetic control circuit for the various solenoids includes an addition to the pressure switch 60 and limit switches 48 and 63, a normally closed emergency return switch 67, a spring returned normally open cycle start switch 68, a multiple contactor relay switch indicated generally by the numeral 69, and normally open relay switches 70 and 71 actuated by electromagnets 72 and 73 respectively. The multiple contactor switch 69 comprises five switches under the influence of a single electromagnet 74, including normally open switches 75 and 76 and normally closed switches 77, 78 and 79, all enclosed within a dotted rectangle to indicate operation in unison. The circuit is energized in the present instance through a transformer 80 having fuses 81 and 82 on either side of its secondary coil and in series with the remainder of the circuit.

Assuming that the pump 37 is operating and that the cycle start switch 68 is open, electric power from transformer 80 will flow through the normally closed relay switches 77, 78 and 79 and energize solenoids 43, 47 and 62. Energized solenoid 43 will shift valve 39 to the rapid return position, driving piston 20 to the right by virtue of hydraulic fluid being pumped through port 41 and discharged to the sump 38 through port 40. At the limit of movement to the right, dog 64 moving with the carriage 10 closes the normally open limit switch 63. Energized solenoid 47 will hold the normally closed resetting valve 45 open, so that pressurized fluid will also be delivered through port 46 to drive piston 31 to the limit of its movement against the stop 30. Energized solenoid 62 will hold the normally closed valve 61 open, connecting the accumulator 53 to the sump 38.

It is realized that once piston 20 reaches its limit of movement to the right, piston 31 will merely "float" with with equal pressure on both sides thereof. However, as will be apparent from the following, piston 31 always has a shorter distance of travel to its limit of movement to the right than has piston 20. Accordingly piston 31 will reach its position adjacent the stop 30 before piston 20 reaches the end plate 22. The resulting positions of the pistons 20 and 31 will be as indicated in Fig. 1.

The above described cycle of operations is started by momentarily closing cycle start switch 68, which closes a circuit through electromagnet 74 and thereby closes relay switches 75 and 76 and opens switches 77, 78, and 79. Opening switches 78 and 79 deenergizes solenoids 47 and 62, permitting the respective resetting valves 45 and 61 to close. Opening switch 77 deenergizes solenoid 43. Closing switch 75 while limit switch 63 is closed energizes electromagnet 72, which closes relay switch 70 to energize solenoid 42. Inasmuch as solenoid 43 is now deenergized by reason of open switch 77, valve 39 is shifted to the rapid advance position, whereat hydraulic fluid is pumped through port 40 and is returned to the sump 38 through port 41. Piston 20 is thus rapidly advanced toward the spacer 34. During this movement, plunger 19 slides through piston 31, which remains stationary, and moves the carriage rapidly toward the workpiece. Likewise during this movement, dog 64 rides off limit switch 63, Fig. 2, which returns to open position and deenergizes electromagnet 72. Normally open relay switch 70 then opens, deenergizing solenoid 42. Valve 39 remains unchanged at the rapid advance position, since solenoid 43 is also deenergized, and the rapid advance stroke continues. Normally open relay switch 76, now closed, completes a holding circuit through the normally closed limit switch 48 and emergency return switch 67, whereby the cycle start switch 68 may be released to open position without deenergizing electromagnet 74.

Upon continued rapid advance of plunger 20 to the left, it will strike spacer 34 as described above and drive piston 31 at a retarded rate, since port 46 must now discharge through the high resistance metering valve 52 into the accumulator 53. Accordingly the drill which is assumed to be rotating is eased into the workpiece for the first step in the drilling operation.

Finally when the hydraulic fluid discharge ahead of the advancing dashpot piston 31 through port 46 and into the accumulator 53 has moved piston 56 downward into engagement with the screw 59, sufficient pressure develops in the accumulator to activate and close pressure switch 60. Electromagnet 73 is then energized and normally open relay switch 71 is closed. As a result, solenoids 62 and 43 are again energized, opening valve 61 and causing valve 39 to shift to rapid return position, since solenoid 42 is now deenergized as aforesaid. Upon opening valve 61, the accumulator spring 57 resets the accumulator piston 56 and the pressure switch 60 reopens when the pressure in the accumulator drops to atmospheric pressure. Opening switch 60 deenergizes electromagnet 73 and normally open switch 71 reopens, deenergizing solenoids 62 and 43. Normally closed valve 61 then closes, but valve 39 remains unchanged at the rapid return position, since solenoid 42 is also deenergized.

Meanwhile, upon shifting valve 39 to the rapid return position, hydraulic fluid enters port 41 directly and slowly enters port 46 through the constriction 65 and check valve 66. Hydraulic fluid is also discharged to the sump 38 through port 40, so that piston 20 and plunger 19 rapidly move to the right, whereas piston 31 slowly moves to the right to effect the slight rebound action as described above.

Upon return movement of the piston 20 and plunger 19 to the limits of movement at the right, dog 64 on shaft 50 closes the normally open limit switch 63, whereby electromagnet 72 is again energized through the normally open but now closed relay switch 75. Switch 70 then closes, energizing solenoid 42 and shifting valve 39 to the rapid advance position. The cycle will thus repeat itself indefinitely until the drilling operation has proceeded to a predetermined depth, whereat dog 49 engages and opens normally closed limit switch 48, phantom position, Fig. 2, to break the holding circuit through normally open but now closed relay switch 76 and deenergize electromagnet 74. As a result, switches 75 and 76 reopen and switches 77, 78 and 79 close, as at the beginning of the operation prior to closing of the cycle start switch 68. The solenoid operated valves 61 and 45 open and valve 39 is shifted to the rapid return position. The accumulator thus resets itself and hydraulic fluid is pumped into ports 41 and 46 and discharged to the sump 38 through port 40. Piston 31, being unencumbered by the plunger 19 and carriage 10, moves to the right in driving engagement with piston 20. At the limit of movement of piston 31 to the right, piston 20 leaves the spacer 34 and continues to its limit of movement.

It is also to be noted that the holding circuit switch 76 can be broken at any phase of the cycle by opening the normally closed emergency return switch 67, which then causes resetting of the mechanism at the condition of Fig. 1 similarly to the action resulting from opening limit switch 48.

In order to permit the mechanism to be readily adapted for use in a customary non-step drilling operation, the hydraulic connection between the metering valve 52 and accumulator 53 is connected through a normally closed valve 83 to the sump 38. Upon opening valve 83, the accumulator 53 as well as pressure switch 60 and solenoid switch 61 are effectively eliminated from the hydraulic and electrical circuits. In that case, hydraulic fluid from the metering valve 52 will flow directly to the sump 38, rather than into the spring loaded accumulator 53. Accordingly pressure switch 60 will never close and solenoid 62 will never be energized to open valve 61.

When the apparatus is adjusted and set as indicated in Fig. 1 and as described above, but with valve 83 open and cycle start switch 68 closed, piston 20 will be driven rapidly leftward in the manner aforesaid. Plunger 19 and carriage 10 will likewise be moved rapidly leftward, advancing the drill toward the workpiece. By properly adjusting the apparatus, piston 20 will engage spacer 34 immediately before the drill strikes the workpiece. The rate of leftward advance will then be retarded by reason of hydraulic fluid discharging ahead of piston 31 through port 46 and thence through the metering valve 52 into the sump 38. The drill will accordingly ease into the workpiece at the retarded rate and continue leftward movement in a drilling operation at the retarded rate until upon completion of the operation, dog 49 opens limit switch 48 to cause rapid return movement of pistons 20 and 31 and the carriage 10 to the right as described above.

A modification of the present invention is illustrated in Fig. 3 wherein the mechanical elements including cylinder 21, pistons 20 and 31, shaft 19, and carriage 10 are the same as above described. In the hydraulic circuit of Fig. 3, an accumulator or cylinder 53a replaces accumulator 53 of Figs. 1 and 2, whereby spring 57 is omitted and piston 56 is hydraulically reset and raised to its upper limit of movement at the end of each slow feed step as described below. Screw 59 merely serves to limit downward movement of piston 56 so as to prevent damage to switch 60a, which is mechanically connected with piston 56 to reciprocate therewith.

Valve 45 and solenoid 47 are replaced by a spring biased valve 45a and a solenoid 47a, respectively, the valve 45a being connected with a conduit which in turn connects the lower end of cylinder 53a with a rapid return outlet of a spring centered four way valve 39a. The latter replaces solenoidal valve 39 and is also provided with a forward movement outlet connected with port 40, a drain outlet connected with sump 38, and an inlet connected with the high pressure outlet of pump 37. The valve 39a is spring biased so that at its normal or rest position shown, the connections to both port 40 and valve 45a are open to sump 38 and closed to pump 37.

Associated with valve 39a are solenoids 42a and 43a which replace solenoids 42 and 43 respectively. Upon energizing solenoid 42a only, the valve 39a is shifted to the right to a forward movement position, whereat port 40 is connected through valve 39a to the pressure of pump 37 and also whereat valve 45a and cylinder 53a are connected through valve 39a to sump 38. Upon energizing solenoid 43a only, valve 39a is shifted to the left to a rapid return position whereat port 40 is connected to drain through valve 39a and also whereat valve 45a and cylinder 53a are connected through valve 39a to the pump output pressure. Valve 45a is likewise spring biased so that at its normal or rest position shown, port 41 is connected through valve 45a to valve 39a. Upon energizing solenoid 47a, valve 45a is shifted to the left so as to be closed to port 41 and to connect valve 39a with port 46 and upper end of metering valve 52 through check valve 84. In other respects, the hydraulic system is the same as above described in regard to Figs. 1 and 2.

In the electrical system of Fig. 3, limit switch 63 is now normally closed and is held open by engagement with dog 64. Otherwise normally closed limit switch 48 and dog 49, normally closed emergency return switch 67, starting switch 68, solenoid 74 and holding switch 76, power source 89, and fuses 81 and 82 are the same as above described. Operating in unison with switches 48 and 67 respectively are normally open switches 48a and 67a which close when their associated switches 48 and 67 respectively are opened. Movable with piston 56 is the vertically adjustable resetting switch 60a which replaces switch 60 and is effective to cause energizing of solenoid 62 as described below when a predetermined volume of fluid is discharged into accumulator 53a via metering valve 52 from in advance of dashpot piston 31. Other features of the electrical circuit of Fig. 3 are described below.

In operation of the system shown in Fig. 3, assuming that the system is at the starting position shown, switch 68 is momentarily closed to energize solenoid 74, thereby to close the normally open solenoidal holding switch 76 and forward movement switch 85. Solenoid 74 is thus energized through switches 76, 67 and 48 after switch 68 is released to the open position. Likewise the forward movement solenoid 42a is energized through switches 85 and 92, whereby valve 39a is shifted to the forward advance position, port 40 is connected through valve 39a to the pressure from pump 37, and port 41 is connected to sump 38 through valves 45a and 39a. Also the lower end of cylinder 53a is connected to sump 38 through valve 39a.

Pressure entering cylinder 21 through port 40 causes rapid advance of piston 20, whereupon spindle 16 advances rapidly toward the work, dog 64 rides off limit switch 63, and the latter closes. When piston 20 engages sleeve 34, the rapid advance is retarded by virtue of fluid discharging slowly from port 46 through metering valve 52 and into accumulator 53a above piston 56. During this period, the drilling tool retained in socket 17 is fed slowly into the workpiece. Also, at the time or immediately after piston 20 engages sleeve 34, a dog 86 adjustably mounted on rod 50 engages and closes normally open limit switch 87. Dog 86 is arranged to hold switch 87 closed at any further advance position of piston 31.

After a predetermined increment of advance movement of piston 31, the fluid displaced thereby into accumulator 53a through metering valve 52 will also have depressed piston 56 the predetermined distance required to close limit switch 60a, thereby to energize solenoid 88, closing normally open solenoid switches 89, 90 and 91 and opening normally closed solenoid switch 92. This state marks the end of the first increment of slow advance movement.

Opening switch 92 deenergizes the forward movement solenoid 42a, while the simultaneous closing of switch 90 energizes the rapid return solenoid 43a. Valve 39a is thus shifted to the rapid return position to discharge fluid under pressure to valve 45a and to the bottom of accumulator 53a and also to connect port 40 to drain 38. Inasmuch as solenoid 47a is not energized, the fluid discharged under pressure to valve 45a is conducted to port 41 and to constriction 65, whereby piston 20 and spindle 16 are rapidly returned to their starting positions. Also fluid conducted to constriction 65 under pressure passes slowly therethrough and through check valve 66 to port 46, causing a slight rebound of piston 31 to the extent and for the reasons above described.

Simultaneously, the closing of switch 91 energizes solenoid 62, shifting valve 61 to the right to connect the upper end of accumulator cylinder 53a to sump 38. In consequence, piston 56 is reset, opening switch 60a. The latter will now have no effect, since solenoid 88 is energized through holding switch 89 via switch 63 which is now closed. Since the forward displacement of piston 31 and correspondingly the quantity of fluid discharged into accumulator 53a is small in comparison to the forward displacement of piston 20, piston 56 will be reset or returned to the top of cylinder 53a substantially before piston 20 is reset or reaches the limit of its return movement. As soon as piston 20 is reset however, dog 64 opens switch 63, deenergizing solenoid 88, whereby switches 89, 90, and 91 open and switch 92 closes. Opening switch 91 deenergizes solenoid 62, shifting valve 61 to the left so as to block both the metering valve 52 and the upper end of cylinder 53a from the sump 38. Opening switch 90 deenergizes the return solenoid 43a, while the simultaneous closing of switch 92 energizes the forward movement solenoid 42a.

Valve 39a is thus shifted again to the rapid advance position, connecting port 40 to the pump pressure and connecting port 41 to drain through valves 45a and 39a. At this condition the lower end of cylinder 53a will also be connected to drain through valve 39a. In consequence, piston 20 will rapidly advance again, causing a repetition of the above described cycle, except that piston 20 will engage sleeve 34 and start the slow feed movement at a location advanced from the initial starting position shown in Fig. 3, as described above with regard to Figs. 1 and 2.

After piston 31 has been advanced to the desired forward limit by successive repetition of the foregoing cycle of operation, dog 49 will engage limit switches 48, 48a, opening switch 48 and closing switch 48a. At this time, both limit switches 63 and 87 will be closed. The opening of switch 48 will break the holding circuit through solenoid 74, causing switches 76 and 85 to open. Opening of the latter switch will deenergize the advance movement solenoid 42a. Closing switch 48a will energize solenoid 93, causing normally open solenoidal switches 94, 95, 96, and 97 to close. The closed switch 94 will establish a holding circuit through switch 87 and solenoid 93 to energize the same after retraction of piston 20 opens switch 48a. The closed switch 95 will cause the rapid return solenoid 43a to be energized, and since solenoid 42a is deenergized, valve 39a will shift to the rapid return position whereat port 40 and valve 45a are connected respectively through valve 39a to drain and to the pump pressure. Solenoid 47a is energized through closed switch 97, shifting valve 45a to the resetting position whereat valve 45a is closed to port 41 and pressure from valve 39a is directed through check valve 84 to port 46. In consequence, piston 31 is caused to retract rapidly, moving sleeve 34, piston 20, and carriage 10 rearward at the same time.

Solenoid 88 is energized through closed switch 96, causing switches 89, 90 and 91 to close and switch 92 to open. Thus solenoid 62 is energized through switch 91, shifting valve 61 to connect the upper end of cylinder 53a and the lower end of metering valve 52 to drain. Since the lower end of cylinder 53a is hydraulically connected in parallelism with the pump pressure delivered through valve 39a to valve 45a, piston 56 is reset to its uppermost position. Although the pump pressure delivered through check valve 84 to port 46 is also connected to sump 38 through metering valve 52, the latter is constricted to pass fluid so slowly that the rearward movement of piston 31 is not prevented, regardless that this movement will be slightly retarded by leakage through metering valve 52 to the sump.

Immediately upon the start of retraction movement of carriage 10, dog 49 will ride off limit switches 48, 48a, causing switch 48 to close and switch 48a to open. Closing switch 48 will have no effect because switch 76 is now open. Opening switch 48a will have no effect because solenoid 93 is independently energized through closed switches 87 and 94. At the time piston 31 reaches its limit of rearward movement, dog 86 will ride off limit switch 87 to open the latter, whereupon solenoid 93 is deenergized and switches 94, 95, 96, and 97 will open. Opening switches 95 and 96 will have no effect because the rapid return solenoid 43a and solenoid 88 are independently energized through switches 90 and 89 respectively. Opening switch 97 will deenergize solenoid 47a, causing valve 45a to shift to its rest position whereat valve 45a is closed to check valve 84 and port 41 is connected to the pump pressure through valve 39a, which latter is still in the rapid return position by virtue of energized solenoid 43a and deenergized solenoid 42a. The pump pressure is also connected through constriction 65 and check valve 66 to port 46, so that as piston 20 moves rearward from the sleeve 34, piston 31 will also be urged rearward against the stop 30 by fluid entering port 46.

When piston 20 reaches its limit of rearward movement, dog 64 engages and opens limit switch 63, whereby solenoid 88 is deenergized, switches 89, 90, and 91 open and switch 92 closes. Closing of the latter has no effect because solenoid 42a is already deenergized by reason of open switch 85. Opening switches 90 and 91 deenergizes solenoids 43a and 62. Valve 39a accordingly shifts to its central rest position whereat both valve 45a and port 40 are open to the drain 38 and closed to pump pressure. Likewise valve 61 shifts to its rest position, closing the connection between the drain 38 and the upper end of cylinder 53a and lower end of metering valve 52. The system is now returned to its starting position.

By virtue of the foregoing, piston 56 is positively reset hydraulically as required and piston 31 is positively returned to its starting position prior to rearward movement of piston 20 from sleeve 34. Accordingly, the possibility that piston 31 might be left floating between its limits of rearward and forward movement is avoided. Also, at the starting position, both ports 40 and 41 are open to sump 38 and closed to pump 37, thereby avoiding the possibility that piston 31 might drift forward from its starting position prior to closing the starting switch 68.

Since normally open switches 48a and 67a are in parallel, the closing of either switch will energize solenoid 93, closing switch 96 and energizing solenoid 88, thereby opening switch 92 and closing switch 90 so as to deenergize the forward movement solenoid 42a and energize the rapid return solenoid 43a. Since normally closed switches 48 and 67 are in series, the opening of either switch will deenergize solenoid 74. Accordingly the ganged switches 67 and 67a are considered emergency return switches and are operable to return the system to the starting position at any stage of the operation in the same manner as by operation of switches 48, 48a when engaged by dog 49. Valve 83 is operative as before to eliminate cylinder 53a and switch 60a from the system and to permit a continuous slow forward movement of piston 31 to the limit of movement determined by the setting of dog 49, as described above.

Still another modification of the present invention is illustrated in Fig. 4 wherein the mechanical elements including cylinder 21, pistons 20 and 31, shaft 19, and carriage 10 are the same as above described. In Fig. 4, the electrical circuit is somewhat simplified, the resetting being accomplished with the cooperation of a mechanically actuated slide valve 100, which replaces solenoid operated valve 45a in Fig. 3, and a spring returned hydraulically actuated slide valve 101, which replaces valve 61. Valve 100 is slidable in a cylindrical housing 102 having ports arranged to connect valve 39a with port 41 when valve 100 is shifted to the right in Fig. 4, or to connect valve 39a with port 46 and the upper end of metering valve 52 through check valve 84 when valve 100 is shifted to the left. Valve 101 is slidable in a cylindrical housing 103 having ports arranged to connect the sump 38 with the lower end of metering valve 52 and upper end of cylinder 53a when valve 101 is shifted upward in Fig. 4. Normally valve 101 is maintained at a lower closed position by spring 104, but is hydraulically shifted upward against the tension of spring 104 by fluid entering the lower end of cylinder 103 from the same outlet of valve 39a that is connected with cylinder 102. The lower end of cylinder 103 is also connected with the lower end of cylinder 53a. In other respects, the hydraulic system is the same as in Fig. 3.

Valve 100 is provided with plunger rods 105 and 106 which shift with valve 100 and extend axially through the ends of cylinder 102, the axis of the latter being parallel to the axis of cylinder 21. A pair of dogs 107 and 108 are adjustably secured to a rod 109, which latter is secured at 110 to carriage 10 for shifting therewith, the rod 109 also extending parallel to the axes of cylinders 21 and 102. A spring retainer 112 is adjustably mounted on rod 109 and spaced from dog 108 by a spring 114 which yieldingly holds dog 108 in position against plunger 106 so as to hold valve 100 at the position of Fig. 4 when piston 20 is at the starting position shown. Similarly dog 107 is adjustably secured on rod 109 in position to engage plunger 105 as described below. As shown in Fig. 4, when carriage 10 is at its most rearward or rightward position, dog 107 is retracted from plunger 105, whereas dog 108 is engaged with plunger 106 to hold valve 100 to the right. At this position of valve 100, port 41 is connected through valve 100 to valve 39a.

In operation of the system starting from the position shown in Fig. 4 whereat valve 39a is at its rest or closed position, starting switch 68 is closed to energize solenoid 74, which initiates the cycle by closing switches 76 and 85. As described above, closed switch 76 maintains the circuit through solenoid 74 via switches 48 and 67, after opening of switch 68, and closed switch 85 energizes the forward movement solenoid 42a via normally closed switch 92. Thus valve 39a shifts to the forward movement position, connecting port 40 with pump 37 and connecting sump 38 with port 41 via valve 100 and with the lower ends of cylinders 103 and 53a.

In consequence, piston 20 is moved rapidly forward, moving dog 64 off switch 63 and permitting the latter to close. When piston 20 engages sleeve 34, the rate of advance is retarded as above described by virtue of the dashpot action of piston 31 and the discharge of fluid through metering valve 52 into accumulator cylinder 53a.

As soon as piston 31 has advanced the increment of distance desired for the work stroke at retarded speed, as determined by the position of adjustment of switch 60a, fluid discharging into accumulator cylinder 53a will have moved piston 56 downward to the position at which switch 60a closes the circuit through relay 88, causing switches 89 and 90 to close and switch 92 to open. Switch 89 closes the holding circuit through relay 88 via the now closed limit switch 63, whereby relay 88 remains energized after 60a opens. Opening of switch 92 deenergizes the forward movement solenoid 42a, whereas closing of switch 90 energizes the return movement solenoid 43a. Valve 39a is thus shifted to the rapid return position whereat port 40 is connected through valve 39a to sump 38 and whereat port 41 is connected through valves 100 and 39a to pump 37. Piston 20 is thus rapidly returned to its starting position, withdrawing the tool and holder 17 from the workpiece. Piston 31 remains substantially at its advanced position, except for a slight rebound as described above resulting from slow discharge of fluid through constriction 65, valve 66, and port 46.

Upon shifting of valve 39a to deliver pressure to port 41 via valve 100, the lower ends of cylinders 103 and 53a are also connected to the pump 37. Thus valve 101 is shifted upward to connect the top of cylinder 53a to sump 38 via valve 101, whereby piston 56 is reset to the upper end of cylinder 53a and switch 60a is reopened.

Throughout the operation thus far, valve 100 remains unchanged at its position shown in Fig. 4.

When piston 20 reaches its limit of rearward movement, limit switch 63 is again opened by engagement with dog 64, breaking the holding circuit through solenoid 88 and deenergizing the latter. Switch 92 closes and switches 89 and 90 reopen. Opening switch 90 deenergizes solenoid 43a, whereas closing switch 92 energizes solenoid 42a. In consequence, valve 39a shifts to the forward movement position, connecting port 40 to pump 37 and connecting port 41 to sump 38 via valve 100 as at the beginning of the cycle. The lower ends of cylinders 103 and 53a are thus also connected to sump 38 through valve 39a, so that valve 101 is reset by spring 104 to the lower end of cylinder 103, closing the connection between the upper end of cylinder 53a and the sump 38. The foregoing cycle is thus repeated successively, advancing piston 31 by successive increments until the desired final depth of the drilling operation is reached.

At the desired final depth, adjustable dog 49 engages limit switches 48, 48a, opening switch 48 and closing switch 48a, as described in regard to Fig. 3. Opening switch 48 breaks the holding circuit through switch 76 and solenoid 74, causing switches 76 and 85 to open. Opening of the latter switch deenergizes the forward movement solenoid 42a. Closing switch 48a energizes solenoid 88, causing switch 92 to open and switches 89 and 90 to close. Closing of the latter switch energizes the rapid return solenoid 43a, shifting valve 39a to the rapid return position whereat cylinder 102 and port 40 are connected to pump 37 and to sump 38 respectively through valve 39a.

The positions of dogs 107 and 108 on rod 109 are determined so that at the desired final depth, dog 107 will have engaged plunger 105 and shifted valve 100 to the left sufficiently to shut off cylinder 102 from port 41 and to connect port 46 through valves 100 and 39a to the pump 37.

As a result, piston 31 will start its rapid return movement, driving sleeve 34 and piston 20 rearward and causing dog 49 to ride off switches 48, 48a. These switches will now have no effect because switch 76 in series with switch 48 is open and solenoid 88 is energized through holding switch 89 independently of switch 48a. Simultaneously with the retraction of piston 31, the pump pressure will be applied to the lower ends of cylinders 103 and 53a, shifting valve 101 upward to connect the upper end of cylinder 53a to sump 38, whereby piston 56 is reset.

The position of retainer 112 is determined so that as piston 31 reaches the end of its return stroke, dog 108 will engage plunger 106 and shift valve 100 to its starting position, Fig. 4. Thus the direct connection between port 46 and the pump pressure is closed and port 41 is connected directly to the pump pressure. Piston 31 remains at the limit of its rearward movement, being held thereat by the pressure of hydraulic fluid leaking through constriction 65 and port 46, whereas piston 20 continues its rearward movement until dog 64 opens switch 63 at the limit of rearward movement. Opening of switch 63 breaks the holding circuit through solenoid 88, permitting switches 89 and 90 to open and switch 92 to close. Opening switch 90 deenergizes the rapid return solenoid 43a, so that spring centered valve 39a returns to its starting or rest position whereat both valve 100 and port 40 are opened to sump 38 and closed to pump 37.

In other respects, the system shown in Fig. 4 is similar to that shown in Fig. 3, as for example in respect to operation of ganged emergency return switches 67, 67a to return the system to the starting position at any stage of the operation, or in respect to opening of valve 83 to eliminate cylinder 53a and switch 60a from the system, or in respect to the positive return and retention of piston 31 at its starting position prior to return of piston 20 to the starting position.

We claim:

1. In a step feeding apparatus for a machine tool holder, fluid actuated means shiftably mounted within a chamber and operatively engaged with the holder to advance or retract the same, means to retard the rate of advance of said holder at successively advanced positions thereof in successive feeding steps including dashpot means comprising a dashpot chamber having a movable element therein and a constricted outlet means for fluid, said movable element being operatively engageable with said fluid actuated means to be driven forward thereby upon predetermined advance movement of the latter during each feeding step, a fluid conduit system including conduit means connected with the first named chamber both in advance of and behind said fluid actuated means, valve means in said system shiftable to a closed condition to close said conduit means to said first named chamber, said valve means being shiftable to a forward movement condition to connect said conduit means behind and in advance of said fluid actuated means with a source of pressurized fluid and to exhaust respectively and being also shiftable to a return movement condition to connect said conduit means in advance of and behind said fluid actuated means with a source of pressurized fluid and to exhaust respectively, a second valve means in the conduit means between said first valve means and said first named chamber in advance of said pressure actuated means, resetting conduit means in said system connecting said second valve means and said dashpot chamber at a location intermediate said movable element and constricted outlet means, said second valve means being shiftable to an operating condition to block said resetting conduit means from said first valve means and to connect the first named conduit means in advance of said fluid actuated means with said first valve means and being also shiftable to a resetting condition to block the first named conduit means in advance of said fluid actuated means from said first valve means and to connect said resetting conduit means with said first valve means.

2. The combination in a step feeding apparatus as set forth in claim 1 and comprising in addition means normally holding said second valve means at the operating condition, control means responsive to movement of said fluid actuated means to a predetermined limit of forward movement to effect shifting of said second valve means to the resetting condition, and control means effective to cause return of the second valve means to the operating condition responsive to retraction of the dashpot movable element to a predetermined rearward position.

3. The combination in a step feeding apparatus as set forth in claim 1 and comprising in addition means normally holding said second valve means at the operating condition, control means for said system responsive to the discharge of a predetermined quantity of fluid from in advance of the movable element of said dashpot means to effect shifting of said first valve means to the return movement condition and being thereafter responsive to retraction of said fluid actuated means to a predetermined retracted position to shift said first valve means to the forward movement condition, said control means being also responsive to movement of said fluid actuated means to a predetermined limit of advanced movement to effect shifting of said first and second valve means to their return movement and resetting conditions respectively and being also responsive to retraction of the dashpot movable element to a predetermined intermediate position to effect shifting of said second valve means to its operating condition and being thereafter responsive to movement of the pressure actuated means to said predetermined retracted position to shift said first valve means to the closed condition, means normally holding said second valve means at the operating condition, control means responsive to movement of said fluid actuated means to a predetermined limit of forward movement to effect shifting of said second valve means to the resetting condition, and control means effective to cause return of the second valve means to the operating condition responsive to retraction of the dashpot movable element to a predetermined rearward position.

4. In a step feeding apparatus for a machine tool holder, a cylinder, a fluid actuated driving piston reciprocable in said cylinder, means operatively connecting said driving piston and holder for recprocation in unison, a fluid actuated dashpot piston reciprocable in said cylinder in advance of said driving piston, reciprocable means adjustably spacing said pistons and engageable therewith to advance the dashpot piston by engagement with the driving piston upon a predetermined advance of the latter and to retract the driving piston by engagement with the dashpot piston upon retraction of the latter, means limiting rearward movement of said dashpot piston to a predetermined intermediate position within said cylinder, an operative fluid conduit system connected with said cylinder, said system being shiftable to an advance movement condition to deliver fluid into and to exhaust fluid from said cylinder behind said driving piston and intermediate said pistons respectively and simultaneously to discharge fluid from said cylinder in advance of the dashpot piston at a restricted rate, thereby to advance the driving piston and to retard the rate of advance of the dashpot piston when driven by said driving piston, said system being shiftable to a retraction condition to deliver fluid into and to exhaust fluid from said cylinder intermediate said pistons and behind said driving piston respectively and simultaneously to deliver fluid into said cylinder in advance of the dashpot piston at a restricted rate, thereby to move said driven piston rapidly rearward and said dashpot piston slowly rearward, said system being shiftable to a resetting position to deliver fluid into and to exhaust fluid from said cylinder in advance of said dashpot piston and behind said driving piston respectively and to block entry of fluid intermediate said pistons, thereby to move said piston rearward, said system being also shiftable to a rest position to block fluid to and from said cylinder both intermediate said pistons and behind said driving piston.

5. The combination in a step feeding apparatus as set forth in claim 4 and comprising in addition control means for said system responsive to retraction of said driving piston to a predetermined rearward position to shift said system to the advance movement condition, a second control means for said system responsive to the discharge of a predetermined quantity of fluid from said cylinder in advance of said dashpot piston to shift said system to said retraction condition, a third control means for said system responsive to the advance of said driving piston to a predetermined forward position to shift said system to the resetting position, said control means being cooperative to shift said system to said retraction condition responsive to retraction of said dashpot piston to said predetermined intermediate position subsequent to shifting of said system to said resetting condition and thereafter to shift said system to said rest condition upon retraction of said driving piston to said predetermined rearward position, thereby to terminate the operating cycle of said driving piston, and a fourth control means for said system selectively operative to initiate the operating cycle of said driving piston.

6. In a step feeding apparatus for a machine tool holder, a cylinder, a fluid actuated driving piston reciprocable in said cylinder, means operatively connecting said driving piston and holder for reciprocation in unison, a fluid actuated dashpot piston reciprocable in said cylinder in advance of said driving piston, reciprocable means adjustably spacing said pistons and engageable therewith to advance the dashpot piston by engagement with the driving piston upon a predetermined advance of the latter and to retract the driving piston by engagement with the dashpot piston upon retraction of the latter, a constricted fluid outlet means for said cylinder in advance of the dashpot piston to retard the rate of advance thereof, a constricted fluid inlet means and a second fluid inlet means for said cylinder intermediate said constricted outlet means and dashpot piston, an operative fluid conduit system including valve means connected with said two inlet means and with said cylinder intermediate said pistons and also including a second valve means connected with said first valve means and said cylinder rearward of said driving piston and with a source of fluid pressure and with exhaust, said valve means being shiftable to an advance movement position to connect said cylinder behind said driving piston and intermediate said pistons to said source of pressure and to exhaust respectively, and being shiftable to a retraction position to connect said constricted fluid inlet means and cylinder intermediate said pistons to said source of pressure and to connect said cylinder behind said driving piston to exhaust, and being shiftable to a resetting position to connect said second fluid inlet means and said cylinder behind said driving piston to said source of pressure and to exhaust respectively.

7. The combination in a step feeding apparatus as set forth in claim 6 and comprising in addition control means for said valve means responsive to retraction of said driving piston to a predetermined retracted position to shift said valve means to said advance movement position, said control means being also responsive to the discharge of a predetermined quantity of fluid from said cylinder in advance of said dashpot piston to shift said valve means to said retraction position, and being also responsive to the advance of said driving piston to a predetermined advanced position to shift said system to the resetting position, and responsive to retraction of said dashpot piston to a predetermined intermediate position from said predetermined advanced position to shift said valve means to the retraction position and thereafter to shift said valve means to said rest position responsive to retraction of said driving piston to said retracted position.

8. In a step feeding apparatus for a machine tool holder, a cylinder, a fluid actuated driving piston reciprocable in said cylinder, means operatively connecting said driving piston and holder for reciprocation in unison, a fluid actuated dashpot piston reciprocable in said cylinder in advance of said driving piston, reciprocable means adjustably spacing said pistons and engageable therewith to advance the dashpot piston by engagement with the driving piston upon a predetermined advance of the latter and to retract the driving piston by engagement with the dashpot piston upon retraction of the latter, means limiting rearward movement of said dashpot piston to a predetermined intermediate position within said cylinder, a constricted fluid outlet means for said cylinder in advance of the dashpot piston to retard the rate of advance thereof, an operative fluid conduit system including a constricted inlet means and a second inlet means for said cylinder intermediate said dashpot piston and restricted outlet means, said system also including a three position valve and a two position valve and a connection therebetween, said three position valve being shiftable to an advance movement position to connect said connection and cylinder behind said driving piston to exhaust and to a source of fluid pressure respectively and being shiftable to a retraction position to connect said connection and cylinder behind said driving piston to a source of fluid pressure and to exhaust respectively and being also shiftable to a rest position to block said source of fluid pressure from said cylinder at either side of said driving piston, said two position valve being shiftable to an operating position to connect both said constricted inlet means and said cylinder intermediate said pistons with said connection and being shiftable to a resetting position to connect said second inlet means with said connection and to block the latter to said constricted inlet means and to said cylinder intermediate said pistons.

9. The combination in a step feeding apparatus as set forth in claim 8 and comprising in addition control means for initiating operation of said driving piston and for normally holding said two position valve in the operating position during said operation, said control means being responsive to retraction of said driving piston to a predetermined retracted position to shift said three position vave to the advance movement position and being responsive to the discharge of a predetermined quantity of fluid from said cylinder through said constricted outlet means to shift said three position valve to the retraction position, said control means being responsive to advance of said driving piston to a predtermined advanced position to shift said two position valve to the resetting position and to shift said three position valve to the retraction position and being responsive to retraction of said dashpot piston adjacent to said intermediate position to shift said two position valve to the operating position and being thereafter responsive to movement of said driving piston to said predetermined retracted position to shift said three position valve to the rest position.

10. In a step feeding apparatus for a machine tool holder, fluid actuated driving piston means and dashpot piston means independently reciprocable within said cylinder and having portions engageable in mutually driving relation upon relative movement of said piston means toward each other, means for connecting said driving piston means and holder for reciprocating the latter, an operative fluid conduit system including operative valve means shiftable to a rapid advance position for connecting said cylinder to exhaust and to pressurized fluid at locations respectively intermediate said piston means and behind said driving piston means, said valve means being shiftable to a retraction position for connecting said cylinder to exhaust and to pressurized fluid at locations respectively behind said driving piston means and intermediate said pistons, and said valve means being shiftable to a resetting position for connecting said cylinder to exhaust and to pressurized fluid at locations respectively behind said driving piston means and in advance of said dashpot piston means and also for blocking entry of pressurized fluid into said cylinder intermediate said piston means.

11. The combination in a step feeding apparatus as set forth in claim 10 and comprising in addition control means for said valve means responsive to resetting movement of said dashpot piston to a predetermined position to effect shifting of said valve means to said retraction position.

References Cited in the file of this patent

UNITED STATES PATENTS

| | | |
|---|---|---|
| 2,079,640 | Vickers et al. | May 11, 1937 |
| 2,324,727 | Shartle | July 20, 1943 |
| 2,631,480 | Romine et al. | Mar. 17, 1953 |